(12) United States Patent
Kato et al.

(10) Patent No.: US 9,650,521 B1
(45) Date of Patent: May 16, 2017

(54) FRICTION MODIFIER FOR TOP COATING AGENT FOR TRIVALENT CHROMIUM CHEMICAL CONVERSION COATING FILM OR CHROMIUM-FREE CHEMICAL CONVERSION COATING FILM, AND TOP COATING AGENT INCLUDING SAME

(71) Applicant: DIPSOL CHEMICALS CO., LTD., Chuo-ku, Tokyo (JP)

(72) Inventors: Yasuhiro Kato, Funabashi (JP); Toshiki Inomata, Koshigaya (JP); Manabu Inoue, Tokyo (JP)

(73) Assignee: DIPSOL CHEMICALS CO., LTD., Tokyo (JP)

( * ) Notice: Subject to any disclaimer, the term of this patent is extended or adjusted under 35 U.S.C. 154(b) by 0 days.

(21) Appl. No.: 15/348,948

(22) Filed: Nov. 10, 2016

Related U.S. Application Data

(63) Continuation of application No. 14/915,226, filed as application No. PCT/JP2014/071642 on Aug. 19, 2014, now abandoned.

(30) Foreign Application Priority Data

Aug. 28, 2013 (JP) ................................ 2013-176901

(51) Int. Cl.
*C09D 7/12* (2006.01)
*C09D 183/06* (2006.01)
*C09D 5/08* (2006.01)
*C23C 22/83* (2006.01)

(52) U.S. Cl.
CPC ............. *C09D 7/1233* (2013.01); *C09D 5/08* (2013.01); *C09D 7/1216* (2013.01); *C09D 183/06* (2013.01); *C23C 22/83* (2013.01); *C23C 2222/10* (2013.01)

(58) Field of Classification Search
CPC ...................................... C09D 5/086
See application file for complete search history.

(56) References Cited

U.S. PATENT DOCUMENTS

| | | | |
|---|---|---|---|
| 2008/0138302 A1* | 6/2008 | Auguste | ............... A61K 8/37 424/59 |
| 2016/0186329 A1 | 6/2016 | Kato et al. | |

FOREIGN PATENT DOCUMENTS

| | | |
|---|---|---|
| EP | 3040447 A1 | 6/2016 |
| JP | H08170020 A | 7/1996 |

* cited by examiner

*Primary Examiner* — Peter F Godenschwager
(74) *Attorney, Agent, or Firm* — Hoffmann & Baron, LLP

(57) ABSTRACT

Provided is a friction modifier for a top coating agent for a hexavalent chromium-free trivalent chromium chemical conversion coating film or chromium-free chemical conversion coating film, said friction modifier including a polyoxyalkylene fatty acid ester.

7 Claims, No Drawings

FRICTION MODIFIER FOR TOP COATING AGENT FOR TRIVALENT CHROMIUM CHEMICAL CONVERSION COATING FILM OR CHROMIUM-FREE CHEMICAL CONVERSION COATING FILM, AND TOP COATING AGENT INCLUDING SAME

CROSS-REFERENCE TO RELATED APPLICATIONS

This application is a continuation of U.S. application Ser. No. 14/915,226, filed Feb. 27, 2016, currently pending, which in turn is a U.S. National Stage filing under U.S.C. §371 of International Application No. PCT/JP2014/071642, filed Aug. 19, 2014, which in turn claims priority to Japanese Patent Application No. 2013-176901, filed Aug. 28, 2013, the entire contents of which are incorporated by reference herein.

TECHNICAL FIELD

The present invention relates to a top coating agent used on a trivalent chromium or chromium-free chemical conversion film for aluminum, magnesium, zinc, and zinc alloys to improve the corrosion resistance and scratch resistance.

BACKGROUND ART

Conventionally, a chromate treatment using hexavalent chromium has been used to improve the corrosion resistance of aluminum, magnesium, zinc, and zinc alloys. However, because of the harmfulness to the human body, the use of hexavalent chromium has been regulated. For this reason, a chemical conversion treatment using trivalent chromium has been used as an alternative to the chromate treatment. Moreover, to improve the corrosion resistance and the scratch resistance, atop coat may be applied on a chemical conversion film or on a finished surface prepared by subjecting a chemical conversion film to a finishing treatment as described in, for example, Japanese Patent Application Publication No. 2005-23372, WO2012/137680, etc. In the top coating treatment, a polyolefin wax-based friction modifier is generally mixed and dispersed in a top coating agent to adjust the friction coefficient. However, an acidic water solvent-based top coating agent, which is generally used for a trivalent chromium chemical conversion film or a chromium-free chemical conversion film, has such a problem that the dispersed polyolefin wax separates, and hence a stable friction coefficient cannot be obtained.

SUMMARY OF INVENTION

Accordingly, an object of the present invention is to provide a friction modifier for a top coating agent for a trivalent chromium chemical conversion treatment coating film or a chromium-free chemical conversion treatment coating film, the friction modifier making it possible to obtain a stable friction coefficient, and to provide a top coating agent comprising the friction modifier.

It has been newly found that a polyoxyalkylene fatty acid ester is effective as a friction modifier for a top coating agent in imparting a stable friction coefficient to a topcoat film on a hexavalent chromium-free trivalent chromium chemical conversion film or a chromium-free chemical conversion film formed on a surface of a substrate of a metal such as aluminum, magnesium, zinc, or a zinc alloy. It is also found that the above-described object can be achieved by a treatment using a top coating agent in which a modified organopolysiloxane and a water-soluble glycol ether are contained in a water solvent and to which a polyoxyalkylene fatty acid ester is added as an friction modifier. The present invention has been made based on these findings.

Specifically, the present invention provides a friction modifier for a top coating agent for a trivalent chromium chemical conversion film or a chromium-free chemical conversion film, the friction modifier comprising a polyoxyalkylene fatty acid ester.

The present invention also provides a top coating agent for a trivalent chromium chemical conversion film or a chromium-free chemical conversion film, the top coating agent comprising: a polyoxyalkylene fatty acid ester; a modified organopolysiloxane; a water-soluble glycol ether; and water.

The present invention makes it possible to impart a stable friction coefficient, a high corrosion resistance, and the like to a surface of a substrate of a metal such as aluminum, magnesium, zinc, or a zinc alloy on which a trivalent chromium chemical conversion film or a chromium-free chemical conversion film is formed.

DESCRIPTION OF EMBODIMENTS

A friction modifier for a top coating agent for a trivalent chromium chemical conversion film or a chromium-free chemical conversion film of the present invention comprises a polyoxyalkylene fatty acid ester.

The polyoxyalkylene fatty acid ester is preferably a saturated or unsaturated fatty acid ester of a poly (lower oxyalkylene) such as polyethylene glycol, polypropylene glycol, or polyisobutylene glycol. Specific examples of the polyoxyalkylene fatty acid ester include polyethylene glycol mono- or di-stearate, polypropylene glycol mono- or di-stearate, polypropylene glycol isostearate, polyethylene glycol mono- or di-oleate, polyethylene glycol mono- or di-laurate, and the like. The HLB of the polyoxyalkylene fatty acid ester is preferably in a range from 8 to 20, and more preferably in a range from 15 to 18. These polyoxyalkylene fatty acid esters are readily available as commercial products. One of the above-described polyoxyethylene fatty acid esters can be used alone, or two or more thereof can be used in combination. The friction modifier may further comprise a known friction modifier other than the polyoxyalkylene fatty acid ester in combination, unless an effect of the friction modifier of the present invention is impaired.

The composition of a top coating agent to which the friction modifier of the present invention used for a top coating agent for a trivalent chromium chemical conversion film or a chromium-free chemical conversion film and comprising the polyoxyalkylene fatty acid ester is added is not particularly limited. However, the top coating agent is preferably a water-soluble solvent top coating agent comprising a water-soluble resin, a water-soluble organic solvent, water, and the like, and further preferably a water solvent-based top coating agent comprising a water-soluble resin and water.

In addition, atop coating agent for a trivalent chromium chemical conversion film or a chromium-free chemical conversion film of the present invention comprises: a polyoxyalkylene fatty acid ester; a modified organopolysiloxane; a water-soluble glycol ether; and water.

The polyoxyalkylene fatty acid ester is as described above. The concentration of the polyoxyalkylene fatty acid ester in the top coating agent is preferably in a range from 1 to 100 g/L, and more preferably in a range from 20 to 60 g/L.

In the modified organopolysiloxane, a hydrophilic segment is bonded to a silicon atom at a terminal or in a side chain of an organopolysiloxane segment. The hydrophilic segment may be a polyalkylene glycol, a polyalkylene glycol monoalkyl ether, an N-acylalkyleneimine, acrylic acid, vinyl alcohol, or the like. The hydrophilic segment is preferably a polyalkylene glycol, and particularly preferably propylene glycol. Accordingly, preferred modified organopolysiloxanes are polyoxyalkylene-modified organopolysiloxanes. Polyoxypropylene-modified organopolysiloxanes (polypropylene glycol-modified organopolysiloxanes) are particularly preferable. These polysiloxanes are readily available as commercially available polypropylene glycol-modified silicones. One of the modified organopolysiloxanes can be used alone, or two or more thereof can be used in combination. The concentration of the modified organopolysiloxane in the top coating agent is preferably in a range from 50 to 450 g/L, and more preferably in a range from 150 to 350 g/L.

The above-described water-soluble glycol ether is preferably an alkylene glycol alkyl ether, and is, for example, a monoalkylene glycol monoalkyl ether or a monoalkylene glycol dialkyl ether. More preferred are ethylene glycol monoalkyl ethers (cellosolves). Specific examples include ethylene glycol monomethyl ether (methyl cellosolve), ethylene glycol monoethyl ether (ethyl cellosolve), ethylene glycol monobutyl ether (butyl cellosolve), propylene glycol monomethyl ethers (2-methoxy-1-propanol, 1-methoxy-2-propanol, and the like), butylene glycol monomethyl ethers (2-methoxy-1-butanol, 3-methoxy-1-butanol, 1-methoxy-2-butanol, and the like), diethylene glycol monomethyl ether, triethylene glycol monomethyl ether, ethylene glycol dimethyl ether (dimethyl cellosolve), ethylene glycol diethyl ether (diethyl cellosolve), and the like. Of these glycol monoalkyl ethers, particularly preferred are ethylene glycol monobutyl ether and butylene glycol monomethyl ethers. One of the above-described water-soluble glycol ethers can be used alone, or two or more thereof can be used in combination. The concentration of the water-soluble glycol ether in the top coating agent is preferably in a range from 50 to 400 g/L, and more preferably in a range from 100 to 200 g/L.

The top coating agent of the present invention may further comprise a colloidal metal oxide. The colloidal metal oxide is preferably silicon oxide, titanium oxide, aluminum oxide, zirconium oxide, zinc oxide, dichromium trioxide ($Cr_2O_3$), or the like. One of the above-described colloidal metal oxides can be used alone, or two or more thereof can be used in combination. The concentration of the colloidal metal oxide in the top coating agent is preferably 150 g/L or less, more preferably in a range from 10 to 100 g/L, and further preferably in a range from 20 to 50 g/L.

The top coating agent of the present invention may further comprise any coloring agent for a coating material, for example, a pigment or dye for coloring. The concentration of the pigment or dye for coloring in the top coating agent is generally in a range from 5 to 100 g/L, and more preferably in a range from 7 to 30 g/L. Examples of blackening agents for blackening include carbon black pigments, carbon-based black pigments used for coating materials, solvent-soluble black dyes, such as metal complex salt dyes including chromium complex salt azo dyes, used for coating materials and being soluble in a solvent such as an organic solvent or water, and the like. As the blackening agent, a combination of a carbon black pigment and a black dye is preferable, because a better black is obtained. In this case, the ratio of the carbon black pigment and the black dye is preferably such that the ratio of carbon black pigment/black dye is in a range from 90/10 to 10/90.

The top coating agent of the present invention may further comprise an ultraviolet absorber. The ultraviolet absorber may be benzophenone, benzotriazole, hydroxyphenylbenzotriazole, hydroxybenzophenone, hydroxyphenyl S triazine, an oxanilide derivative, or the like. One of the above-described ultraviolet absorbers can be used alone, or two or more thereof can be used in combination. The concentration of the ultraviolet absorber in the top coating agent is preferably 150 g/L or less, and more preferably in a range from 5 to 100 g/L.

The top coating agent of the present invention may further comprise additives for coating materials, a so-called stainproofing agent for preventing stain and an anti-mold agent for preventing the development of mold used for metal surface treatment agents and the like, a surfactant and a water-soluble resin for improving the uniformity and gloss of the finished appearance, an anti-tarnish agent, and the like. The balance of the top coating agent of the present invention other than the above-described components is water. In addition, as in the case of ordinary coating materials, the top coating agent can be used after being diluted to a moderate concentration with, for example, water and a water-soluble organic solvent, for example, water and butyl cellosolve, for the purposes of adjustment of the coating workability, the storability, the thickness of the coated film, and the like. For example, the concentration of the top coating agent in the diluted top coating agent solution is 30 to 100% by weight, and preferably 50 to 80% by weight.

A topcoat film to be formed on a trivalent chromium chemical conversion film or a chromium-free chemical conversion film can be obtained by immersing a workpiece in the above-described top coating agent, or by applying the above-described top coating agent to a workpiece with a spray, then sufficiently draining the top coating agent by centrifugation, and sufficiently drying the film. The centrifugal drainage is preferably performed at 200 to 1000 rpm. In addition, the draining time is preferably 2 to 5 minutes. The drying temperature is preferably 100 to 220° C. In addition, the drying time is preferably 10 to 60 minutes. If the drying temperature is below the range, the corrosion resistance decreases. If the drying temperature is too high, the corrosion resistance decreases. If the drying time is shorter than 10 minutes, the corrosion resistance decreases. In addition, too long a drying time is not economical. In addition, as a method for drying the topcoat film, a two-stage drying method is preferable which includes preliminary drying and subsequent main drying. The preliminary drying is preferably conducted at a drying temperature of 30° C. to 80° C. for a drying time of 3 to 30 minutes. The main drying is preferably conducted at a drying temperature of 100° C. to 220° C. for a drying time of 10 to 60 minutes. The preliminary drying at 80° C. or below is preferable, because it is possible to prevent failures of the film such as breakage and an attachment failure of the film due to the shrinkage of the film during drying at high temperature.

In addition, the thickness of the above-described topcoat film is generally 0.8 to 5 μm, and preferably 1 to 3 μm. When the thickness is within this range, a topcoat film having a high corrosion resistance can be obtained with excellent appearance, and it is also possible to prevent the formation of a pool of the liquid, the generation of a stain, and the decrease in dimensional precision.

Metal substrates used in the present invention include substrates of metals and alloys such as various metals including iron, nickel, copper, and aluminum, alloys thereof, and aluminum subjected to a zincate conversion treatment in various shapes such as a plate, a cuboid, a solid cylinder, a hollow cylinder, or a sphere.

The above-described metal substrate may be plated with zinc or a zinc alloy in a usual manner. To deposit zinc plating on the substrate, it is possible to use any one of acidic or neutral baths such as a sulfuric acid bath, a fluoborate bath, a potassium chloride bath, a sodium chloride bath, and an ammonium chloride eclectic bath, and alkaline baths such as a cyanide bath, a zincate bath, and a pyrophosphate bath. Especially, a zincate bath is preferable. In addition, the zinc alloy plating may be conducted by using any alkaline bath such as an ammonium chloride bath or an organic chelate bath. In addition, the zinc alloy plating may be zinc-iron alloy plating, zinc-nickel alloy plating, zinc-cobalt alloy plating, tin-zinc alloy plating, or the like. The thickness of the zinc or zinc alloy plating may be any, and is preferably 1 μm or more, and more preferably 5 to 25 μm.

A method for using the top coating agent of the present invention is not particularly limited, as long as the top coating agent of the present invention is used for a top coating on a trivalent chromium chemical conversion film or a chromium-free chemical conversion film formed on the above-described substrate metal or on various films optionally formed on the trivalent chromium chemical conversion film or the chromium-free chemical conversion film. A method for using the top coating agent of the present invention is, for example, as follows. Specifically, the above-described substrate metal as it is or the substrate metal on which zinc or zinc alloy plating has been deposited is optionally subjected to a pretreatment such as washing with water or washing with water and a subsequent activation treatment with nitric acid. Then, a chemical conversion treatment is conducted by, for example, a method based on an immersion treatment or the like by using a treatment solution for forming a trivalent chromium chemical conversion film or a chromium-free chemical conversion film. After that, the chemical conversion film is optionally subjected to a finishing treatment described in, for example, Japanese Patent Application Publication No. 2005-23372 or WO2012/137680. After that, the top coating agent of the present invention is used as an agent for top coating.

Specifically, for example, when a trivalent chromium chemical conversion film is formed on a metal substrate having a zinc or zinc-based alloy plating layer, the metal substrate is generally immersed in a trivalent chromium chemical conversion treatment solution, for example, for 5 to 600 seconds with the liquid temperature being 10 to 80° C. Thus, a trivalent chromium chemical conversion film having a thickness of about 0.1 to 0.3 μm is formed on the zinc or zinc-based alloy plating layer. Note that when the metal substrate is plated with zinc, the workpiece is generally immersed in a diluted nitric acid solution before the trivalent chromium chemical conversion treatment to increase the gloss of the trivalent chromium chemical conversion film. This pretreatment may be employed, but does not necessarily have to be employed in the present invention. Moreover, when a finishing treatment is performed on the thus formed trivalent chromium chemical conversion film, a layer of a finishing agent is formed on the trivalent chromium chemical conversion film as follows. Specifically, after or without washing the metal substrate having the trivalent chromium chemical conversion film, the trivalent chromium chemical conversion film is brought into contact with the finishing agent in the form of an aqueous solution (preferably, immersed in an aqueous finishing agent solution) to attach the finishing agent. Then, without washing with water, the metal substrate is dehydrated and dried to form the layer of the finishing agent. In the finishing treatment, the contact temperature (preferably, the immersion temperature) is generally 10 to 80° C., the contact time (preferably, immersion time) is 3 to 30 seconds, the drying temperature is 50° C. to 200° C., and the drying time is 5 minutes to 60 minutes. In addition, the thickness of the finished layer may be any, and is preferably about 0.05 to 0.3 μm.

In the present invention, a treatment solution used for forming the trivalent chromium chemical conversion film or the chromium-free chemical conversion film is not particularly limited, and any one of various known chemical conversion treatment solutions for zinc, a zinc alloy, aluminum, an aluminum alloy, or the like can be used. For example, as the trivalent chromium chemical conversion treatment liquid, it is possible to use any one of various trivalent chromate treatment liquids described in U.S. Pat. No. 5,415,702, Japanese Patent Application Publication Nos. 2003-166074, 2003-166075, 2002-053975, 2005-171296, and 2004-285373, etc. In addition, black trivalent chromate treatment solutions described in Japanese Patent Application Publication Nos. 2003-26856 and 2007-100206, WO2007/094496, WO2007/100135, etc. are particularly preferable.

Meanwhile, examples of the chromium-free chemical conversion treatment solution include chromium-free chemical conversion treatment solutions described in Japanese Patent Application Publication Nos. 2010-031332 and 2009-138132 etc.

Of these chemical conversion treatment solutions, for example, a trivalent chromium black chemical conversion treatment liquid for zinc or zinc alloy plating is described in further detail. As a supply source of trivalent chromium ions, any chromium compound containing trivalent chromium ions can be used. It is preferable to use a trivalent chromium salt such as chromium chloride, chromium sulfate, chromium nitrate, chromium phosphate, or chromium acetate. One of the above-described supply sources of trivalent chromium can be used alone, or two or more thereof can be used in combination. The concentration of trivalent chromium in the treatment liquid is not limited in terms of performance, but is preferably made as low as possible from the viewpoint of the wastewater treatment. Accordingly, considering the corrosion resistance performance and the like, the concentration of trivalent chromium ions in the treatment liquid is preferably in a range from 0.5 to 20 g/L, and more preferably in a range from 1 to 10 g/L. A concentration of trivalent chromium ions within this range is advantageous in terms of the wastewater treatment and is also economically advantageous. Note that the above-described trivalent chromium black chemical conversion treatment liquid is a trivalent chromium black chemical conversion treatment liquid for forming a coating generally called a hexavalent chromium-free trivalent chromium black chemical conversion film.

The above-described trivalent chromium black chemical conversion treatment liquid does not necessarily have to contain a chelating agent. However, it is preferable to contain a chelating agent, because a more uniform chemical conversion film can be obtained. The chelating agent may be an organic carboxylic acid having a chelate-forming ability, a salt thereof, or the like. In addition, among organic carboxylic acids, preferred are dicarboxylic acids such as oxalic acid, malonic acid, succinic acid, citric acid, and adipic acid, oxycarboxylic acids such as citric acid, tartaric acid, and malic acid, and polycarboxylic acids such as tricarballylic acid. These organic carboxylic acids may be in the form of salts (for example, salts with sodium, potassium, ammonium, or the like). One of the above-described chelating agents can be used alone, or two or more thereof can be used in combination. The concentration of the chelating agent in the treatment liquid is preferably in a range from 1 to 40 g/L, and more preferably in a range from 5 to 35 g/L. In addition, when a chelating agent is contained, the mole ratio of the chelating agent to the trivalent chromium ions [(concentration of chelating agent (mol/L)/concentration of trivalent chromium ions (mol/L)] is preferably 0.2 to 4, and more preferably 1 to 2. In addition, a method for mixing the chelating agent with the trivalent chromium compound is not particularly limited. For example, the formation of the complex may be promoted in advance by mixing under heating at a temperature of 60° C. or above, and then the mixture may be used.

The above-described trivalent chromium black chemical conversion treatment liquid may further contain additional metal ions other than trivalent chromium ions. As the metal ions, metal ions selected from the group consisting of Co, V, Ti, W, Zr, Mn, Mo, Ta, Ce, Sr, Fe, and Al ions may be contained. The supply source of the metal ions may be a chloride, nitrate, sulfate, acetate, oxoacid salt, or the like of the metal ions. One of the above-described metal ion species can be used alone, or two or more thereof can be used in combination. The concentration of the metal ions in the treatment liquid is preferably in a range from 0.1 to 50 g/L, and more preferably in a range from 0.5 to 20 g/L.

In addition to the above-described components, it is possible to add one or more selected from phosphorous acid, phosphinic acid, alkali salts thereof, and phosphate esters and phosphite esters such as phosphoric acid alkyl esters and phosphorous acid alkyl esters. In this case, the concentration in the treatment liquid is preferably 0.1 to 50 g/L, and more preferably 0.5 to 20 g/L.

The treatment liquid may further comprise a sulfur compound. The sulfur compound may be an inorganic sulfur compound or an organic sulfur compound. Of these sulfur compounds, the sulfur compound is preferably an organic sulfur compound. Especially, thiourea, thioacetic acid, thioglycolic acid, thiomalic acid, thiomaleic acid, dithioglycolic acid, sodium salts thereof, and ammonium salts thereof are preferable. The concentration of the sulfur compound in the treatment liquid is preferably 0.1 to 10 g/L.

The zinc ion concentration in the above-described trivalent chromium black chemical conversion treatment liquid increases with the progress of the chemical conversion treatment. The zinc ion concentration in the treatment bath during the use is 20 g/L or less. It is preferable that the zinc ion concentration be in a range from 0.1 g/L to 20 g/L, and that the zinc ion concentration at the initial stage (at the initial make-up of the bath) be in a range from 0.1 g/L to 10 g/L. Too high a zinc ion concentration in the treatment bath is not preferable, because the corrosion resistance and the degree of blackness decrease. In addition, a zinc ion measurement method employed for managing the zinc ion concentration during the chemical conversion treatment is not particularly limited, and the zinc ion concentration can be managed precisely based on a known method such as a titration analysis, ion plasma spectrometry, or atomic absorption spectrometry. The trivalent chromium ion concentration can also be managed using the same method.

The above-described trivalent chromium black chemical conversion treatment liquid may further comprise one or more inorganic acid ion species selected from the group of ions of phosphorus oxoacids other than phosphorous acid, phosphinic acid, alkali salts thereof, phosphoric acid alkyl esters, and phosphorous acid alkyl esters, chlorine ions, nitrate ions, sulfate ions, and the like. The supply source of the inorganic acid ions may be phosphoric acid, phosphinic acid, hydrochloric acid, nitric acid, sulfuric acid, a salt thereof, or the like. One of the above-described inorganic acid ions can be used alone, or two or more thereof can be used in combination. The total concentration of the inorganic acid ions in the treatment liquid is preferably in a range from 1 to 80 g/L, and more preferably in a range from 2 to 20 g/L.

The pH of the above-described trivalent chromium black chemical conversion treatment liquid is preferably 0.5 to 5, and more preferably 1 to 4. The pH may be adjusted by using the above-described inorganic acid or an alkaline agent such as an alkali hydroxide or ammonia water. The balance of the above-described trivalent chromium black chemical conversion treatment liquid other than the above-described components is water.

For example, when a topcoat film formed from the top coating agent of the present invention is a black topcoat film containing a blackening agent, the trivalent chromium black chemical conversion film used as a lower layer is preferably formed by using a hexavalent chromium-free trivalent chromium black chemical conversion treatment liquid having a Zn ion concentration of 20 g/L or less. In addition, the amount of chromium ions attached in the trivalent chromium black chemical conversion film is preferably 0.2 to 3.0 mg/dm$^2$. When the amount of chromium ions attached is within the range, an excellent black appearance and a high corrosion resistance can be obtained.

Next, the present invention will be described based on Examples and Comparative Examples; however, the present invention is not limited to Examples.

EXAMPLES

Films were measured according to the following methods.
(Method for Evaluating Stability of Top Coating Agent)
A top coating agent (500 mL) is placed in a 500 mL plastic bottle, and allowed to stand at room temperature for one week. After that, the separation of the liquid is visually observed.
(Method for Measuring Thickness of Topcoat Film)
A bolt is cut at the center between two surfaces of the head portion, and the film thickness is measured with an electron microscope.
(Method for Evaluating Finished Appearance)
The color of the exterior is visually observed.
(Method for Corrosion Resistance Test)
A salt spray test was conducted according to JIS Z 2371 to evaluate the time to the formation of white rust.
(Total Friction Coefficient)
The total friction coefficient is measured by the fastening test method according to JIS B 1084.

Example 1

M6 bolts (iron) plated with zinc by a zincate process (using NZ-110 bath manufactured by DIPSOL CHEMICALS Co., Ltd.) to a thickness of 8 μm were used. On the bolts, trivalent chromium chemical conversion films were formed by using a trivalent chromium chemical conversion treatment liquid (ZT-444DSMT type manufactured by DIPSOL CHEMICALS Co., Ltd., ZT-444DSM1: 75 mL/L and ZT-444DST: 1 mL/L, chemical conversion treatment conditions; 35° C.×20 seconds). Subsequently, the bolts were subjected to a centrifugal dehydrator (700 rpm, 3 minutes). After that, topcoat films were formed by using a top coating agent shown in Table 1 below to which a friction modifier was added, and the bolts were subjected to a centrifugal dehydrator (700 rpm, 3 minutes), and dried (200° C., 10 minutes).

The obtained bolts were measured for the topcoat film thickness, the finished appearance, the corrosion resistance, the scratch resistance, and the total friction coefficient.

Example 2

On zinc-plated bolts of the same type as in Example 1, trivalent chromium black chemical conversion films were formed by using a trivalent chromium black chemical conversion treatment liquid (ZTB-447S123C3 type manufactured by DIPSOL CHEMICALS Co., Ltd., ZTB-44751: 50 mL/L, ZTB-44752: 20 mL/L, and ZTB-44753: 7 mL/L, chemical conversion treatment conditions: 30° C.×40 seconds). Subsequently, the bolts were subjected to a centrifugal dehydrator (700 rpm, 3 minutes). After that, black topcoat films were formed by using a black top coating agent shown in Table 1 below to which a friction modifier was added, and subjected to a centrifugal dehydrator (700 rpm, 3 minutes), preliminary drying (40° C., 5 minutes), and then main drying (200° C., 10 minutes).

The obtained bolts were measured for the topcoat film thickness, the finished appearance, the corrosion resistance, the scratch resistance, and the total friction coefficient.

Example 3

On zinc-plated bolts of the same type as in Example 1, trivalent chromium black chemical conversion films were formed by using a trivalent chromium black chemical conversion treatment liquid (ZTB-447S123C3 type manufactured by DIPSOL CHEMICALS Co., Ltd., ZTB-44751: 50 mL/L, ZTB-44752: 20 mL/L, and ZTB-44753: 7 mL/L, chemical conversion treatment conditions: 30° C.×40 seconds). Further, a finishing treatment was conducted (ZTB-118 type manufactured by DIPSOL CHEMICALS Co., Ltd., ZTB-118: 150 mL/L, 45° C., 10 seconds). Subsequently, the bolts were subjected to a centrifugal dehydrator (700 rpm, 3 minutes). After that, black topcoat films were formed by using a black top coating agent shown in Table 1 below to which a friction modifier was added. Then, the bolts were subjected to a centrifugal dehydrator (700 rpm, 3 minutes), and dried (200° C., 10 minutes).

The obtained bolts were measured for the topcoat film thickness, the finished appearance, the corrosion resistance, the scratch resistance, and the total friction coefficient.

Comparative Example 1

On zinc-plated bolts of the same type as in Example 1, trivalent chromium chemical conversion films were formed by using a trivalent chromium chemical conversion treatment liquid (ZT-444DSMT type manufactured by DIPSOL CHEMICALS Co., Ltd., ZT-444DSM1: 75 mL/L and ZT-444DST: 1 mL/L, chemical conversion treatment conditions: 35° C.×20 seconds). Subsequently, the bolts were subjected to a centrifugal dehydrator (700 rpm, 3 minutes). After that, topcoat films were formed by using a top coating agent shown in Table 1 below. Then, the bolts were subjected to a centrifugal dehydrator (700 rpm, 3 minutes), and dried (200° C., 10 minutes).

The obtained bolts were measured for the topcoat film thickness, the finished appearance, the corrosion resistance, the scratch resistance, and the total friction coefficient.

Comparative Example 2

On zinc-plated bolts of the same type as in Example 1, trivalent chromium black chemical conversion films were formed by using a trivalent chromium black chemical conversion treatment liquid (ZTB-447S123C3 type manufactured by DIPSOL CHEMICALS Co., Ltd., ZTB-44751: 50 mL/L, ZTB-44752: 20 mL/L, and ZTB-44753: 7 mL/L, chemical conversion treatment conditions: 30° C.×40 seconds). Subsequently, the bolts were subjected to a centrifugal dehydrator (700 rpm, 3 minutes). After that, black topcoat films were formed by using a black top coating agent shown in Table 1 below. Then, the bolts were subjected to a centrifugal dehydrator (700 rpm, 3 minutes), and dried (200° C., 10 minutes).

The obtained bolts were measured for the topcoat film thickness, the finished appearance, the corrosion resistance, the scratch resistance, and the total friction coefficient.

Comparative Example 3

On zinc-plated bolts of the same type as in Example 1, trivalent chromium chemical conversion films were formed by using a trivalent chromium chemical conversion treatment liquid (ZT-444DSMT type manufactured by DIPSOL CHEMICALS Co., Ltd., ZT-444DSM1: 75 mL/L and ZT-444DST: 1 mL/L, chemical conversion treatment conditions: 35° C.×20 seconds) Subsequently, the bolts were subjected to a centrifugal dehydrator (700 rpm, 3 minutes), and dried (200° C., 10 minutes).

The obtained bolts were measured for the topcoat film thickness, the finished appearance, the corrosion resistance, the scratch resistance, and the total friction coefficient.

Comparative Example 4

On zinc-plated bolts of the same type as in Example 1, trivalent chromium black chemical conversion films were formed by using a trivalent chromium black chemical conversion treatment liquid (ZTB-447S123C3 type manufactured by DIPSOL CHEMICALS Co., Ltd., ZTB-44751: 50 mL/L, ZTB-44752: 20 mL/L, and ZTB-44753: 7 mL/L, chemical conversion treatment conditions: 30° C.×40 seconds). Further, a finishing treatment was conducted (ZTB-118 type manufactured by DIPSOL CHEMICALS Co., Ltd., ZTB-118: 150 mL/L, treatment conditions: 45° C.×10 seconds). Subsequently, the bolts were subjected to a centrifugal dehydrator (700 rpm, 3 minutes), and dried (80° C. 10 minutes).

The obtained bolts were measured for the topcoat film thickness, the finished appearance, the corrosion resistance, the scratch resistance, and the total friction coefficient.

Comparative Example 5

On zinc-plated bolts of the same type as in Example 1, trivalent chromium chemical conversion films were formed by using a trivalent chromium chemical conversion treatment liquid (ZT-444DSMT type manufactured by DIPSOL CHEMICALS Co., Ltd., ZT-444DSM1: 75 mL/L and ZT-444DST: 1 mL/L, chemical conversion treatment conditions: 35° C.×20 seconds). Subsequently, the bolts were subjected to a centrifugal dehydrator (700 rpm, 3 minutes).

After that, topcoat films were formed by using a top coating agent shown in Table 1 below to which a conventional polyolefin wax friction modifier was added. Then, the bolts were subjected to a centrifugal dehydrator (700 rpm, 3 minutes), and dried (200° C., 10 minutes).

The obtained bolts were measured for the topcoat film thickness, the finished appearance, the corrosion resistance, the scratch resistance, and the total friction coefficient.

Comparative Example 6

On zinc-plated bolts of the same type as in Example 1, trivalent chromium black chemical conversion films were formed by using a trivalent chromium black chemical conversion treatment liquid (ZTB-4475123 C3 type manufactured by DIPSOL CHEMICALS Co., Ltd., ZTB-44751: 50 mL/L, ZTB-44752: 20 mL/L, and ZTB-44753: 7 mL/L, chemical conversion treatment conditions: 30° C.×40 seconds). Subsequently, the bolts were subjected to a centrifugal dehydrator (700 rpm, 3 minutes). After that, black topcoat films were formed by using a black top coating agent shown in Table 1 below to which a conventional polyolefin wax friction modifier was added. Then, the bolts were subjected to a centrifugal dehydrator (700 rpm, 3 minutes), and dried (200° C., 10 minutes).

The obtained bolts were measured for the topcoat film thickness, the finished appearance, the corrosion resistance, the scratch resistance, and the total friction coefficient.

TABLE 1

Composition of Top Coating Agents

|  | Ex. 1 | Ex. 2 | Ex. 3 | Comp. Ex. 1 | Comp. Ex. 2 | Comp. Ex. 5 | Comp. Ex. 6 |
|---|---|---|---|---|---|---|---|
| Polyoxyethylene sorbitan monolauric acid ester (HLB value: 17) (g/L) | 50 | 50 | 50 | — | — | — | — |
| Polyethylene wax | — | — | — | — | — | 50 | 50 |
| Polypropylene glycol-modified silicone (g/L) | 250 | 250 | 250 | 250 | 250 | 250 | 250 |
| Butyl cellosolve (g/L) | 150 | 150 | 150 | 150 | 150 | 150 | 150 |
| Carbon black (g/L) | — | 10 | 10 | — | 10 | — | 10 |
| Colloidal silica (g/L) | 30 | 30 | 30 | 30 | 30 | — | — |
| Benzophenone (g/L) | 50 | 50 | 50 | 50 | 50 | — | — |

The balance was water.

TABLE 2

|  | Ex. 1 | Ex. 2 | Ex. 3 |
|---|---|---|---|
| Stability of top coating agent | Not separated | Not separated | Not separated |
| Thickness of topcoat film (μm) | 2 | 2 | 2 |
| Finished appearance | Silver-white | Black | Black |
| Corrosion resistance Time for which white rust was not formed (h) | 600 | 480 | 600 |
| Total friction coefficient | 0.23 | 0.23 | 0.23 |

TABLE 3

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Stability of top coating agent | Not separated | Not separated | — | — | Separated | Separated |
| Thickness of topcoat film (μm) | 2 | 2 | 0 | 0 | 2 | 2 |
| Finished appearance | Silver-white | Black | Light blue | Black | Silver-white | Black |
| Corrosion resistance Time for which white rust was not formed (h) | 600 | 480 | 72 | 72 | 480 | 380 |
| Total friction coefficient | 0.45 | 0.45 | 0.45 | 0.45 | 0.23 | 0.23 |

The invention claimed is:

1. A method for forming a top coating on a hexavalent chromium-free trivalent chromium chemical conversion film or a chromium-free chemical conversion film, the method comprising the step of immersing the hexavalent chromium-free trivalent chromium chemical conversion film or the chromium-free chemical conversion film in a top coating agent or applying a top coating agent to the hexavalent chromium-free trivalent chromium chemical conversion film or the chromium-free chemical conversion film with a spray, wherein the top coating agent comprises:
    a polyoxyalkylene fatty acid ester in an amount of 1 to 100 g/L;
    a modified organopolysiloxane;
    a water-soluble glycol ether; and
    water.

2. The method according to claim 1, wherein
    the content of the modified organopolysiloxane is 50 to 450 g/L, and
    the content of the water-soluble glycol ether is 50 to 400 g/L.

3. The method according to claim 1, wherein the top coating agent further comprises a colloidal metal oxide.

4. The method according to claim 3, wherein the colloidal metal oxide is at least one selected from the group consisting of silicon oxide, titanium oxide, aluminum oxide, zirconium oxide, zinc oxide, and dichromium trioxide ($Cr_2O_3$).

5. The method according to claim 1, wherein the top coating agent further comprises a black pigment.

6. The method according to claim 5, wherein the black pigment is at least one selected from carbon black and black dyes.

7. The method according to claim 1, wherein the top coating agent further comprises an ultraviolet absorber.

* * * * *